United States Patent
Long et al.

(10) Patent No.: US 8,588,611 B2
(45) Date of Patent: Nov. 19, 2013

(54) METHOD FOR ESTABLISHING AN INTER-DOMAIN PATH THAT SATISFIES WAVELENGTH CONTINUITY CONSTRAINT

(75) Inventors: Keping Long, Chengdu (CN); Yunfeng Peng, Chengdu (CN); Zongwei Wang, Chengdu (CN); Zhen Chen, Chengdu (CN); Yin Wang, Chengdu (CN)

(73) Assignee: University of Electronic Science and Technology of China, Chengdu, Sichuan (CN)

(*) Notice: Subject to any disclaimer, the term of this patent is extended or adjusted under 35 U.S.C. 154(b) by 269 days.

(21) Appl. No.: 13/226,316

(22) Filed: Sep. 6, 2011

(65) Prior Publication Data

US 2012/0308225 A1    Dec. 6, 2012

(30) Foreign Application Priority Data

Jun. 1, 2011 (CN) .......................... 2011 1 0146505

(51) Int. Cl.
*H04J 14/00* (2006.01)

(52) U.S. Cl.
USPC ................................. 398/57; 398/13; 398/56

(58) Field of Classification Search
USPC .......................................... 398/10–21, 56–57
See application file for complete search history.

(56) References Cited

U.S. PATENT DOCUMENTS

| | | | |
|---|---|---|---|
| 2009/0142056 A1 | 6/2009 | Bernstein et al. | |
| 2010/0202773 A1 | 8/2010 | Lee et al. | |
| 2010/0220996 A1 | 9/2010 | Lee et al. | |
| 2012/0163390 A1* | 6/2012 | Iovanna et al. | 370/400 |
| 2012/0201539 A1* | 8/2012 | Boertjes et al. | 398/51 |
| 2012/0213063 A1* | 8/2012 | Lu et al. | 370/228 |
| 2013/0051224 A1* | 2/2013 | Vasseur et al. | 370/228 |
| 2013/0077493 A1* | 3/2013 | Aissaoui et al. | 370/235 |
| 2013/0121338 A1* | 5/2013 | Kusama et al. | 370/400 |

OTHER PUBLICATIONS

A. Giorgetti, et al., Hierarchical PCE in GMPLS-Based Multi-Domain Wavelength Switched Optical Networks, Optical Fiber Communication Conference and Exposition and National Fiber Optic Engineers Conference, Los Angeles CA, Mar. 6-10, 2011.

* cited by examiner

*Primary Examiner* — Dzung Tran
(74) *Attorney, Agent, or Firm* — Vedder Price P.C.; Thomas J. Kowalski; Rebecca G. Rudich

(57) ABSTRACT

The present invention provides a method for establishing an inter-domain path that satisfies wavelength continuity constraint. The fPCE stores a virtual topology comprised by border nodes of all domains. The present invention uses parallel inter-domain path establishment method to decrease the influence from WCC. Compared with the sequential process way in prior art, it enhanced the resource utilization and decreased computation delay.

3 Claims, 5 Drawing Sheets

METHOD FOR ESTABLISHING AN INTER-DOMAIN PATH THAT SATISFIES WAVELENGTH CONTINUITY CONSTRAINT

CROSS REFERENCED TO RELATED APPLICATIONS

This application claims priority under the Paris Convention to Chinese Patent Application No. 201110146505.5, Filed Jun. 1, 2011, the entirety of which is hereby, incorporated by reference for all purposes as if fully set forth herein.

FIELD OF THE INVENTION

The present invention relates to the field of communication technology, more particularly to a method for establishing an hierarchical PCE-based inter-domain path that satisfies wavelength continuity constraint.

BACKGROUND OF THE INVENTION

With the development of network technology, the network services grow explosively. And wavelength division multiplexing (WDM) can satisfy the ever-increasing bandwidth demands, so it will be the core technology for future all optical networks undoubtedly.

In WDM based wavelength switch optical networks, the wavelength converters are expensive, so decreasing the use of wavelength converters is necessary. When there are few wavelength converters or no wavelength converter in optical network, to transmit data on end-to-end path, it is necessary to designate a same wavelength at each node of the path, which is known as wavelength continuity constraint (WCC).

The communication network is becoming more huge due to the increase of optical network services. In order to maintain and manage, a big domain is divided into many small domains forming a distributed network. Generally, a domain is a set of network elements within the scope of a common address management or a path computation area of network, such as an Autonomous System (AS) or an Interior Gateway Protocol (IGP) area. For the consideration of confidentiality and security, each domain maintains internal network information itself, such as network topology and available resources, and conceals them from other domains, which brings that the internal network information of other domain is unknown and only few information on topology and resources is exchanged among domains for confidentiality, computing and configuring, i.e. establishing an inter-domain path that satisfies wavelength continuity constraint in multi-domain network is difficult.

Establishing a path in multi-domain optical network, i.e. computing and configuring an inter-domain path that satisfies wavelength continuity constraint in multi-domain network is usually a time-consumption procedure. In a dynamic multi-domain optical network, such long time delay on path establishment will seriously decrease the success of path provision, for resources conflict will arise from that long time delay. For example, the available wavelength detected in path establishment will probably be grabbed by other connections due to the long time delay, and that will ruin the previous efforts. Therefore, to find a method for computing and configuring an inter-domain path efficiently is vital to minimize the influence of wavelength continuity constraint on path establishment.

The path computation element (PCE) architecture proposed by Internet Engineering Task Force (IETF) has high performance in computing inter-domain path. Each PCE maintains a traffic engineering database (TED), which contains the link and resource information of its own domain such as the wavelength utilization information. PCE uses various path computing technologies, such as the backwards recursive path computation (BRPC) to complete the computation of end-to-end inter-domain path.

FIG. 1 is a schematic diagram of inter-domain path establishment based on BRPC in prior art. In which, OXC is optical cross-connected device, TX is the transmitting port of optical signal, and RX is the receiving port of optical signal.

As shown in FIG. 1, the processes of computing inter-domain path based on BRPC are as follows: the source node N11 as path computation client (PCC) sends computation request to PCE1 in its domain. The PCEs needed to complete this computation are predetermined. The PCE1 in the source node domain, i.e. Domain1 will send the computation request to the downstream PCE, i.e. PCE2 in Domain2. When downstream PCE receives the computation request, it will send the computation request to its downstream PCE, i.e. PCE3 in Domain3. When the computation request arrives at the domain which involves the destination node N33, i.e. Domain 3, PCE3 managing Domain3 will stop transmitting the computation request, and compute a virtual shortest path tree (VSPT) which is a multicast tree from all the entry nodes to the destination node in the domain. After the computation, it passes the VSPT to the upstream PCE. The upstream PCE also computes a VSPT from all the entry nodes of its domain to the entry node of the downstream domain, and combine this VSPT with the received VSPT from downstream domain. Then, it passes this combined VSPT to its upstream PCE. With the backwards recursive path computation method, the PCE which manages the domain involving the source node will finally gain a whole VSPT, and it picks out an optimal path from it. Then the optimal path is transmitted to the source node as reply message. Up to now, the inter-domain path computation is finished. It's noted that PCE utilizes a sequential way when computing inter-domain path, this is, when the downstream PCE is computing path, the upstream PCE is waiting, causing a certain delay in time, as shown in FIG. 1. In FIG. 1, (1) (2) represent the submitting of inter-domain path computation and the replying of computation result processes.

When the source node receives the path computation result, it initiates the RSVP-TE protocol to proceed with the second step, the resource configuration, namely, the wavelength reservation at each node, cross connecting the designated wavelength channel in the fiber signal receiving port which connects the upstream node, with the same wavelength channel in the fiber signal transmitting port which connects the downstream node to finish the path establishment.

The resource reservation protocol-traffic engineering (RSVP-TE) is the most popular signaling protocol performing resources reservation or provision. RSVP-TE utilizes the PATH and RESV messages to fulfill resource configuration along the path, including wavelength checking and reservation.

The PATH message including a Label Set (LS) object traverses hop-by-hop from the source to the destination gathering the wavelength information along the path. The LS object is created at the source node containing available wavelength labels on its outgoing downstream fiber link. And it will be updated depending on the actual available wavelengths on links along the path. If one or more wavelengths in the link from current node to the next node are unavailable and these labels also exist in the LS object, these labels will be removed from the LS object. Finally when the PATH message arrives at the destination node, the wavelength labels in the LS object are available wavelength labels of the path. If the LS object is empty, it denotes that no wavelength satisfies WCC along the path at this moment.

When the destination node receives the PAHT message, it chooses one available wavelength label from the LS object, and sends it to the upstream node as RESV message in an opposite direction to actually reserve wavelength on each node. When the RESV message arrives at the source node, the wavelength reservation along the path is successfully completed, and the service data can be transmitted. However, it will take a long time for the node which received the RESV message to reserve wavelength. Wavelength reservation on the node will consume approximately 10-15 ms. Compared with wavelength reservation, message delivery delay is much shorter for its light speed in fiber. One fiber link of 1 Km consumes only 0.0033 ms. So, wavelength reservation will be a long time consuming procedure when the inter-domain path spans more nodes, as shown in FIG. 1 (3), and that will undoubtedly increase the risk of resource conflict.

From the above analysis, it is visible that to inter-domain path establishment, no matter the sequential computation procedure of PCE or the resource reservation, namely wavelength reservation in lower layer, is long time consuming, and wavelength reservation is the main factor of long time delay. Long time delay can increase the risk of resource conflict and blocking probability of establishment of inter-domain path. At the same time, PCE does not engage in resource configuration process of each node or link, so it does not work on wavelength continuity constraint.

SUMMARY OF THE INVENTION

The present invention aims to overcome the deficiencies of prior art and provides a method for establishing an inter-domain path that satisfies wavelength continuity constraint with shorter time delay and lower risk of resource conflict.

To achieve these objectives, in accordance with the present invention, a method for establishing an inter-domain path that satisfies wavelength continuity constraint is provided, comprising the following steps:

(1) PCE is designed as two layers, the first layer is Child PCE (cPCE), and the second is Father PCE (fPCE); Each domain has a cPCE, responsible for path processing within its domain; The fPCE is responsible for information communication among cPCEs, and maintains a data base, in which a virtual topology architecture comprised by the border nodes of all domains is stored;

(2) The source node sends an inter-domain path establishment request containing the source node and the destination node to the cPCE of its domain, the cPCE of the source node domain sends the inter-domain path establishment request to the fPCE;

After receiving the inter-domain path establishment request, the fPCE will compute one or multiple abstract paths according to the virtual topology architecture stored in its database, and sends it or them to each domain's cPCE; the abstract path only contains border nodes along the way from the source node to the destination node;

(3) After receiving the abstract path or paths, the cPCE in each domain computes concrete nodes that the abstract path or paths will pass, and obtains one or multiple concrete path segments comprised by the concrete nodes; The cPCE in each domain checks the wavelengths utilization information along the concrete path segment or segments and send the concrete path segment or segments and the information of available wavelengths in the concrete path segment or segments to the fPCE;

(4) After receiving the concrete path segment or segments and the information of available wavelengths in the concrete path segment or segments from each cPCE, the fPCE combines all concrete path segments into end-to-end paths, chooses an optimal end-to-end path and an available wavelength on the optimal end-to-end path, and sends the optimal end-to-end path and it's available wavelength to each cPCE;

(5) After receiving the optimal end-to-end path and the available wavelength on the optimal end-to-end path, each cPCE reserves the available wavelength on the path segment which is the part of the optimal end-to-end path passing its domain: Connecting the designated available wavelength's channel of the fiber signal receiving port with the fiber signal transmitting port in the optical cross-connected device of the node, the fiber signal receiving port and the fiber signal transmitting port are connected with the upstream node and the downstream node respectively; If the wavelength reservation is successful, the cPCE will send the fPCE a message informing successful path segment establishment in its domain; If the wavelength reservation fails, the cPCE will send the fPCE a message informing failed path segment establishment in its domain;

(6) After the fPCE receiving all successful path segment establishment messages from all cPCEs, it will send a successful end-to-end path establishment message to the cPCE of the domain to which the source node belongs; Then, the cPCE sends the successful path establishment message to the source node, and the source node starts to transmit data using the available wavelength; thus, an inter-domain path that satisfies wavelength continuity constraint is successfully established;

If receiving a failed path segment establishment message denoting the inter-domain path establishment failed, the fPCE sends the cPCE of the domain to which the source node belongs a failed establishment message, then the cPCE sends it to the source node.

The objectives of the present invention are realized as follows:

To decrease the time delay and the resource conflict in establishment of an inter-domain path, the present invention, a method for establishing an inter-domain path that satisfies wavelength continuity constraint, employs a hierarchical PCE architecture. There are two layers in the hierarchical PCE architecture. The first layer PCE is cPCE, and the second is fPCE. The fPCE stores a virtual topology comprised by border nodes of all domains. First, the source node sends inter-domain path establishment request to the fPCE via the cPCE of its domain. The fPCE computes one or multiple abstract paths containing border nodes only according to the virtual topology architecture and sends the abstract path or paths to each cPCE in each domain; Then, the cPCE in each domain computes the concrete path segment or segments and the information of available wavelengths in the concrete path segment or segments, and send them to the fPCE. The fPCE combines all concrete path segments into end-to-end paths, chooses an optimal end-to-end path and an available wavelength on the optimal end-to-end path, and sends them to each cPCE; Finally, each cPCE reserves the available wavelength for the path segment which is the part of the optimal end-to-end path passing its domain, and sends the reservation result to the fPCE; If the all reservations on the path segment are successful, the inter-domain path is successfully established, otherwise, the inter-domain path establishment fails; the fPCE sends the establishment result to the source node via the cPCE of the domain to which the source node belongs.

The present invention uses parallel inter-domain path establishment method to decrease the influence from WCC.

In present invention, the end-to-end inter-domain path is computed and configured in the way of path segments. Each cPCE is responsible for computing and wavelength reserving for the path segment belonging to its domain. And the coordination between the cPCEs is managed by the fPCE in higher layer. If the path establishment request is an intra-domain one, the corresponding cPCE can directly deal with it independently without handing it to the fPCE. If the path establishment request is inter-domain one, it is necessary to report to the fPCE, and process the request under the coordination of the fPCE.

As the cPCEs are independent with each other, they work in parallel in the inter-domain path establishment. Compared with the sequential process way in prior art, it enhanced the resource utilization and decreased computation delay. In addition, when configuring wavelength at each node, i.e reserving the available wavelength, the number of nodes needed to be configured in each domain is small, and the configuration is processed in parallel in each domain, so it saves much time when configuring wavelength. It's noted that though there are much communication signaling between the cPCEs and the fPCE, because of its short delay, the present invention decreased the time delay of inter-domain path establishment generally.

BRIEF DESCRIPTION OF THE DRAWING

The above and other objectives, features and advantages of the present invention will be more apparent from the following detailed description taken in conjunction with the accompanying drawings, in which.

DETAILED DESCRIPTION OF THE PREFERRED EMBODIMENT

Figure 1:
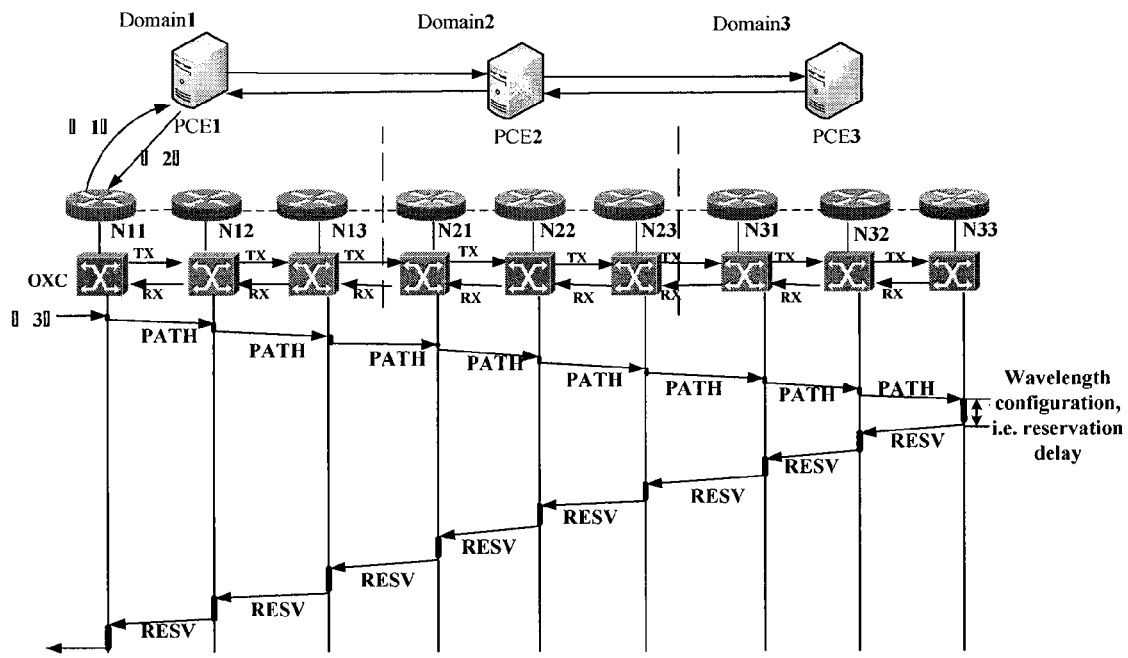
FIG. 1 is a schematic diagram of inter-domain path establishment based on BRPC in prior art.

Hereinafter, preferred embodiments of the present invention will be described with reference to the accompanying drawings. It should be noted that the similar modules are designated by similar reference numerals although they are illustrated in different drawings. Also, in the following description, a detailed description of known functions and configurations incorporated herein will be omitted when it may obscure the subject matter of the present invention.

Embodiment 1

Figure 2:
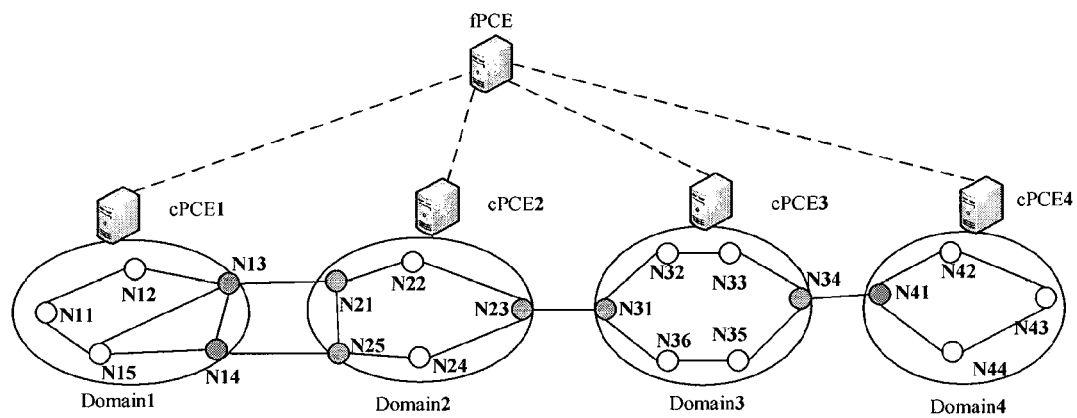
FIG. 2 is a schematic diagram of the logically hierarchical PCE topology architecture according to one embodiment of the present invention.
Figure 3:
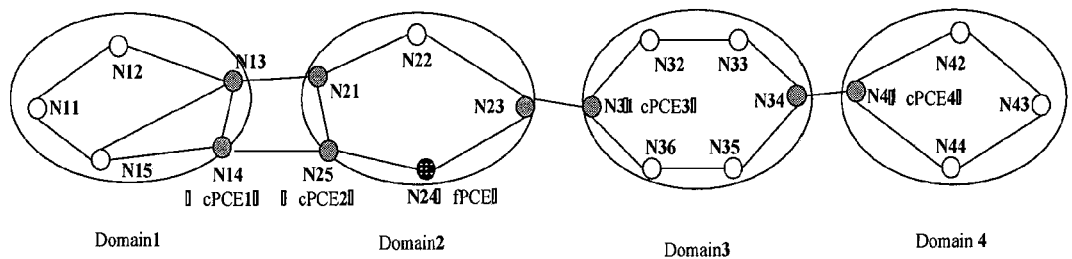
FIG. 3 is a schematic diagram of the physically hierarchical PCE topology architecture corresponding to FIG. 2 according to one embodiment of the present invention.
Figure 4:
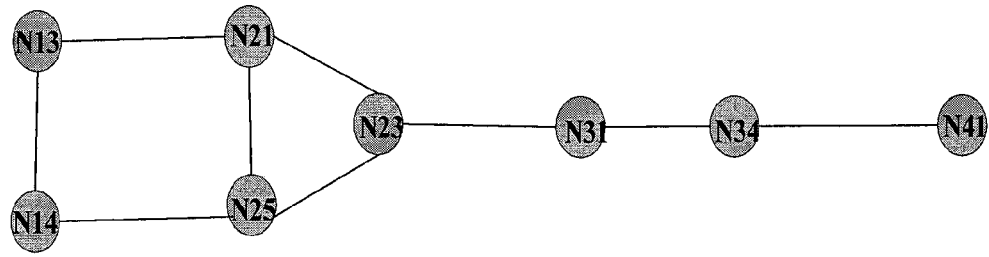
FIG. 4 is a schematic diagram of virtual topology stored in TED of the fPCE according to one embodiment of the present invention.

In one embodiment, as shown in FIG. 2~FIG. 4, the present invention utilizes hierarchical PCE architecture.

FIG. 2 is a schematic diagram of the logically hierarchical PCE topology architecture. As shown in FIG. 2, the fPCE is located at up layer, coordinating all cPCEs. The cPCEs are placed at lower layer, responsible for path computing and wavelength checking on path segments.

FIG. 3 is a schematic diagram of the physically hierarchical PCE topology architecture corresponding to FIG. 2. Node N13, N14; N21, N25, N23; N31, N34; N41 are border nodes of Domain1~4. The cPCEs are placed at border node N14, N25, N31, N41 respectively. The fPCE can be placed at node which locates in middle domain or isolated as an independent device. In this embodiment, the fPCE is placed at node N24 in Domain2. The fPCE maintains a traffic engineering database (TED) which stores a virtual topology architecture comprised by all the border nodes of the domains. It is used to compute abstract path. FIG. 4 is a schematic diagram of virtual topology stored in TED of the fPCE corresponding to FIG. 2, and FIG. 3 is its physical topology.

The communications between the fPCE and the cPCEs are based on the PCEP protocol except five new appending messages: suggest message, assign message, config ok message, confirm ok message, and Error message. And those messages can easily be extended in PCEP protocol. Suggest message contains a set of labels involving available wavelengths along a path segment within a domain, and suggest messages are sent to the fPCE by the cPCEs. Assign message contains an assigned wavelength, i.e. the available wavelength which is chosen by the fPCE, assign message is sent to the cPCEs, informing them to establish path with the path segments of the optimal end-to-end path and the available wavelength chosen by the fPCE to satisfy WCC. Config ok message denotes that the configuration of path segment in its domain is accomplished. Confirm ok message denotes that the end-to-end inter-domain path has been successfully established. Error message denotes that the establishment of an inter-domain path is failed.

The core idea of the present invention is computing and configuring an inter-domain path in a parallel way. All the path computation and wavelength reservation in each domain are independent and in parallel. Each domain does not interfere with the other domain. The fPCE is a coordinator responsible for collecting available wavelength information and path segments, choosing an optimal end-to-end path and an available wavelength on the optimal end-to-end path, and sending the optimal end-to-end path and it's available wavelength to each cPCE to establish an inter-domain path.

Figure 5:
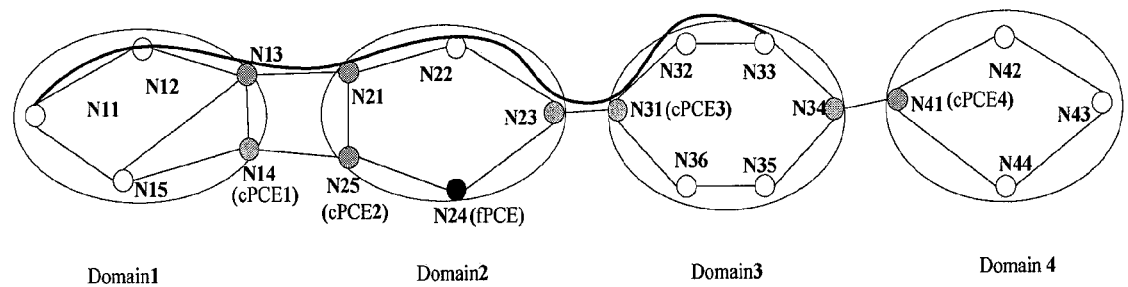
FIG. 5 is a schematic diagram of the inter-domain path establishment under the logically hierarchical PCE topology architecture shown in FIG. 2 according to one embodiment of the present invention.
Figure 6:
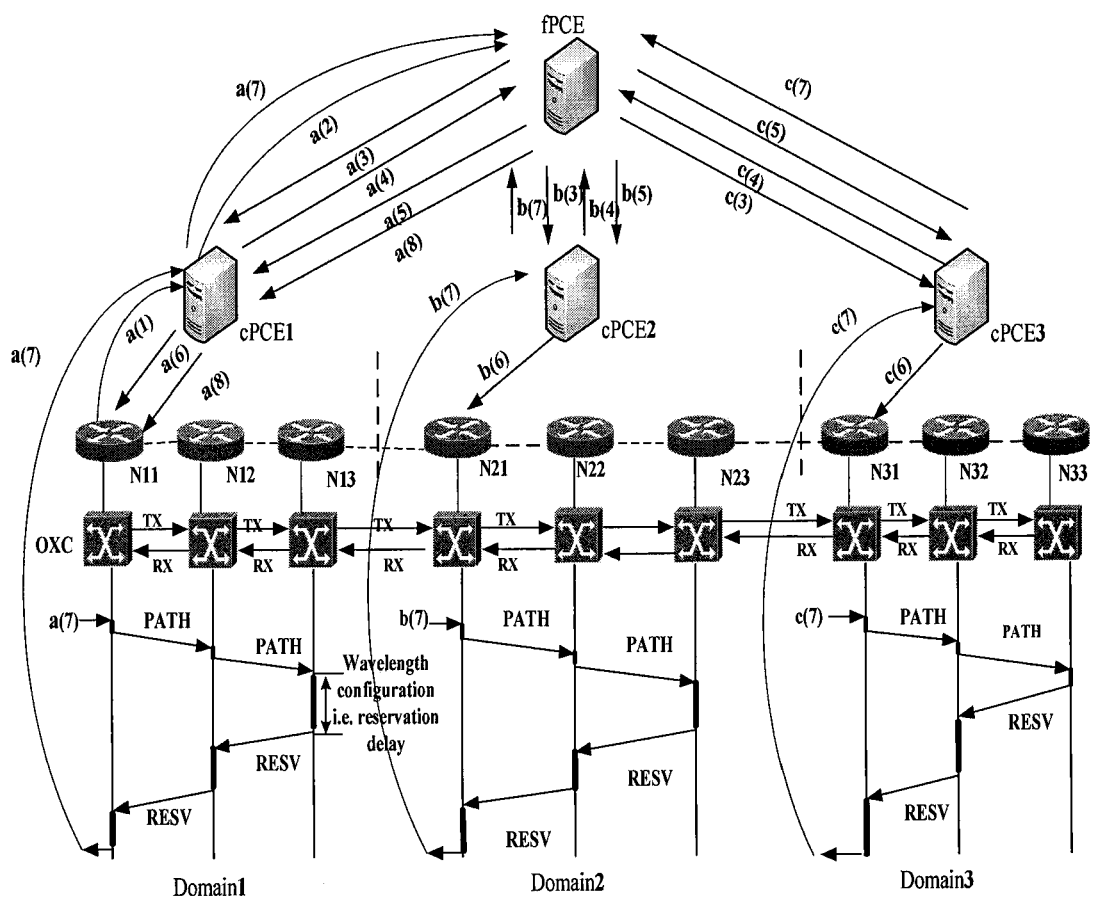
FIG. 6 is a schematic diagram of the inter-domain path computation and wavelength configuration signaling procedures under the logically hierarchical PCE topology architecture shown in FIG. 2 according to one embodiment of the present invention.
Figure 7:
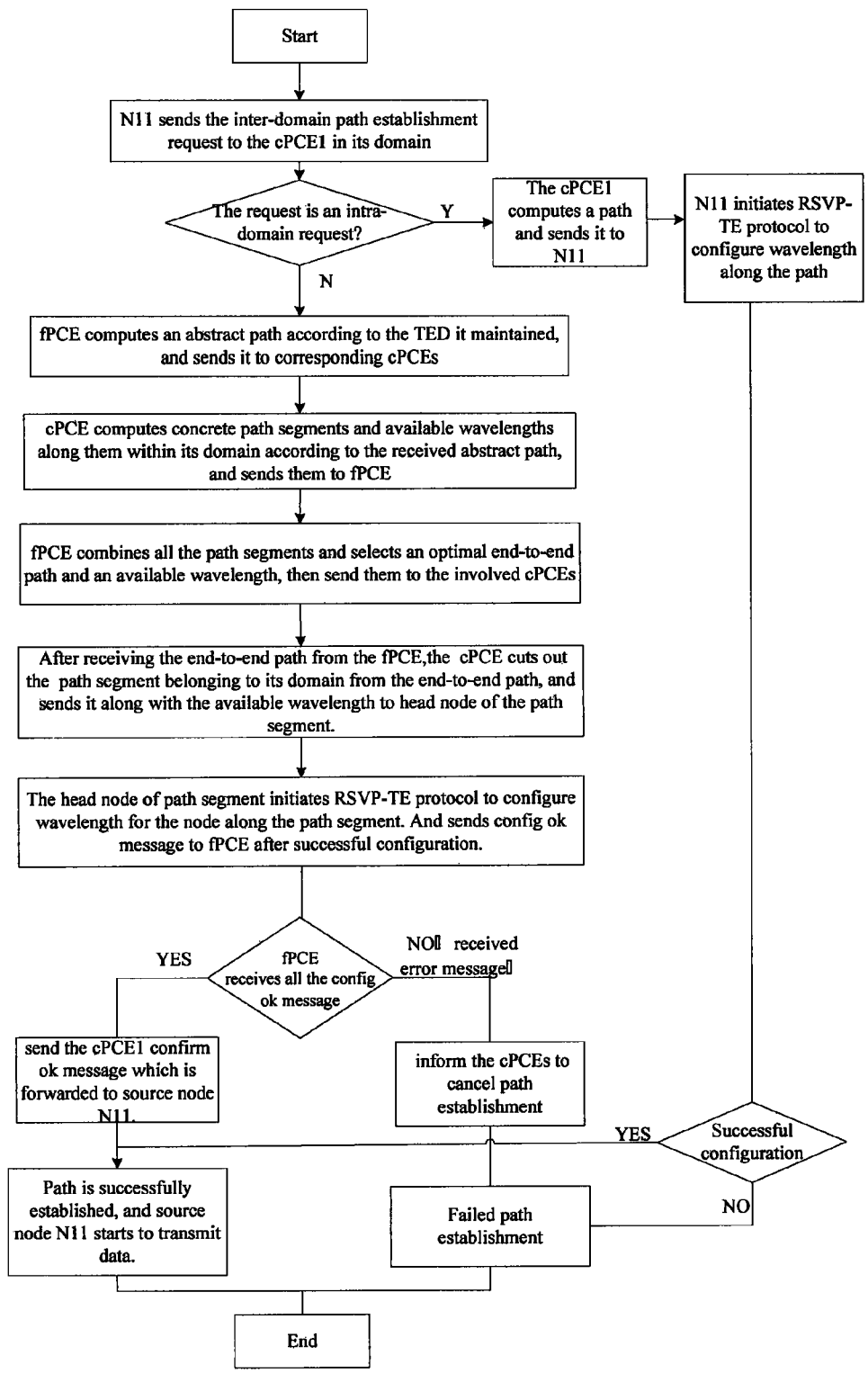
FIG. 7 is a flow chart of inter-domain path establishment procedures corresponding to hierarchical PCE topology architecture shown in FIG. 2 according to one embodiment of the present invention.

FIG. 5 is a schematic diagram of the inter-domain path establishment under the logically hierarchical PCE topology architecture shown in FIG. 2. Its corresponding signaling diagram is shown in FIG. 6. FIG. 7 is a flow chart of inter-domain path establishment procedures corresponding to hierarchical PCE topology architecture shown in FIG. 2. In this embodiment, there is no wavelength converter. Referring to FIG. 5, FIG. 6 and FIG. 7, the concrete procedures are as follows:

Step a(1): N11 as the source node sends the inter-domain path establishment request from node N11 to N33 to the cPCE1.

Step a(2): The cPCE1 processes the inter-domain path establishment request when receiving it. It checks if the destination node belongs to its domain. If it is an intra-domain request, it will compute an intra-domain path and send it back to the source node N11. Else, if the request is an inter-domain one, it will send the request to the fPCE immediately.

Step a(3),b(3),c(3): After receiving the request from the cPCE1, the fPCE first finds out which domain the source node belongs to, namely Domain1 and border nodes N13 and N14, and which domain the destination node belongs to, namely Domain3 and border nodes N31 and N34. Then the fPCE computes abstract paths from Domain1 to Domain3: N13-N21-N23-N31 and N14-N25-N23-N31, according to virtual topology in its TED as shown in FIG. 4. Then, it appends the source node and the destination node to them and gets two whole abstract paths: N11-N13-N21-N23-N31-N33 and N11-N14-N25-N23-N31-N33. The fPCE sends the two abstract paths to the cPCEs which manage the domains that the abstract paths pass, namely cPCE1, cPCE2, cPCE3.

Parallel step a(4),b(4),c(4): After receiving the abstract paths from the fPCE, the cPCE in each domain checks the border nodes which belong to its domain in the received abstract path. According to these border nodes, the cPCE computes the concrete path segment crossing its domain. For example, after the cPCE1 receives the abstract paths from the fPCE, it finds that nodes N12-N13 and N11-N14 belong to its domain, and it computes two concrete path segments according to them: nodes N11-N12-N13 and nodes N11-N15-N14. And it can compute the available wavelengths on them according to the resource information in its TED. The cPCE1 sends this result including path segments and available wavelengths to the fPCE. After cPCE2 receives the abstract paths from the fPCE, it finds that nodes N21-N23 and nodes N25-N23 belong to its domain, and it computes two concrete path segments according to them: nodes N21-N22-N23 and nodes N25-N24-N23. And it computes the available wavelengths on them according to the resource information in its TED. The cPCE2 sends this result including path segments and available wavelengths to the fPCE. After the cPCE3 receives message from the fPCE, it finds that nodes N31-N33 belongs to its domain, and it computes concrete path segment according to it: nodes N31-N32-N33. And it computes the available wavelengths on it according to the resource information in its TED. The cPCE3 sends this result including path segment and available wavelengths to the fPCE. The cPCEs use suggest message when sending these results to the fPCE.

Parallel step a(5),b(5),c(5): when the fPCE receives all the suggest messages, it will combine all the received concrete path segments into end-to-end paths. Then it chooses an optimal end-to-end path from the paths and an available wavelength λ on the optimal end-to-end path. In this embodiment, after the fPCE receives all the concrete path segments, it will combine them into two end-to-end paths: nodes N11-N12-N13-N21-N22-N23-N31-N32-N33 and nodes N11-N15-N14-N25-N24-N23-N31-N32-N33, and available wavelengths on them. The fPCE chooses one optimal end-to-end path from them. In this embodiment, it chooses the path: nodes N11-N12-N13-N21-N22-N23-N31-N32-N33 as the optimal end-to-end path. And it chooses an available wavelength λ of it. Then, the fPCE sends this result as assign message to the involved cPCEs, namely cPCE1, cPCE2, cPCE3, indicating them to configure wavelength for the path.

Parallel step a(6),b(6),c(6): after receiving the assign message from the fPCE, each cPCE will send the path segment belonging to its domain and the available wavelength label λ to the head node of this path segment, asking for wavelength configuration for each node of the path segment in its domain. For example, the cPCE1 sends the path segment nodes N11-N12-N13 and the available wavelength label λ to its head node N11. The cPCE2 sends the path segment nodes N21-N22-N23 and the available wavelength label λ to its head node N21. The cPCE3 sends the path segment nodes N31-N32-N33 and the available wavelength label λ to its head node N31.

Parallel step a(7),b(7),c(7): After receiving the path segment belonging to its domain and the available wavelength label λ, the head node in each path segment triggers RSVP-TE protocol, and begins to reserve the wavelength. The LS object in PAHT message contains the assigned available wavelength label λ only. The PATH message traverses hop-by-hop from head node to tail node along the path segment. At each node, it first checks whether the assigned available wavelength λ is still available at this moment. If it is occupied by other service, a path-error message is sent back. This is the error message in RSVP-TE protocol which is sent to the head node of the path segment. At the head node, an error message is produced and sent to the cPCE and finally sent to the fPCE. When the fPCE receives this error message, denoting failed path establishment, it will inform other cPCEs to cancel path segment configuration, i.e. available wavelength reservation, and also inform the source node N11 of the failed establishment. If the assigned available wavelength λ is still available at this moment, PATH message is passed to next hop to check the status of available wavelength λ. When the PATH message is passed to the tail node, it denotes that the available wavelength λ of the path segment is still available, and a RESV message is produced at the tail node, which is sent back from the tail node to the head node hop-by-hop. At each node, RESV message actually reserve the available wavelength λ. If the wavelength is successfully reserved, RESV message is passed to the next upstream node. Else if the available wavelength λ is occupied by other service, an error message is produced and sent to the head node. When RESV message is passed to the head node, the path segment in this domain is successfully established and a config ok message denoting successful establishment is produced. The error message or the config ok message is sent to the fPCE via the cPCE.

Step 8: If the path segment in each domain is successfully established, all messages the fPCE received are config ok messages. In embodiment, the fPCE receives the config ok messages from the cPCE1, the cPCE2, and the cPCE3. After the fPCE has received all config ok messages, it will send a confirm ok message to the cPCE which sends it the inter-domain path establishment request, denoting successful inter-domain path establishment. Then this cPCE will send the confirm ok message to the source node. After receiving the confirm ok message, the source node will start to transmit data.

Step 9: the source node N11 starts to transmit data.

From the above steps, it is visible that no matter the path segment computation procedure or the wavelength reservation, the processes are in a parallel way. All the domains can process simultaneously, which saves much time and decreases the influence from WCC. The other advantage of the present invention is that before actually reserving the wavelength along the path, the fPCE has known well about the wavelength information of it. If the fPCE finds no wavelength is available, it informs the source node that no path can be found right now, and no need to initiate the RSVP-TE protocol to gather wavelength information, which enhances path establishment efficiency.

Embodiment 2

Figure 8:
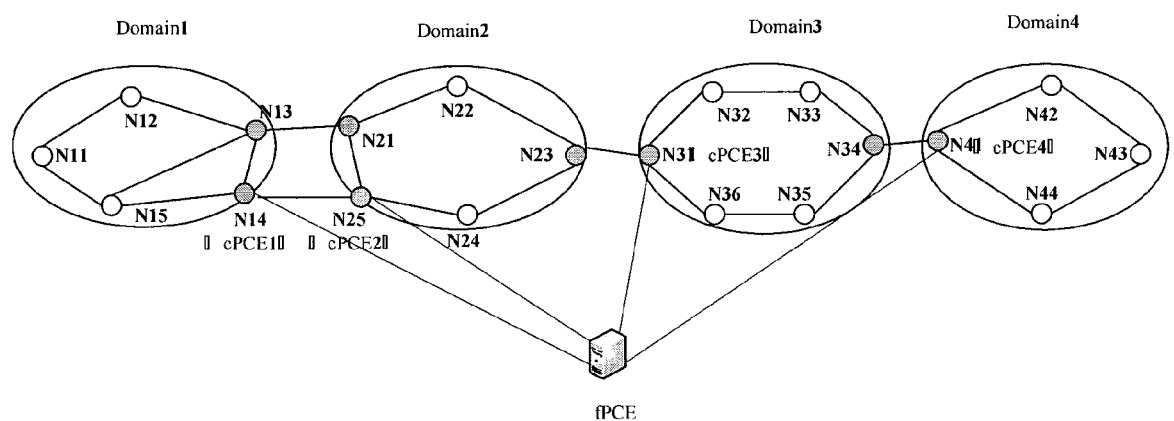
FIG. 8 is another schematic diagram of the physically hierarchical PCE topology architecture corresponding to FIG. 2 according to one embodiment of the present invention.

FIG. 8 is another schematic diagram of the physically hierarchical PCE topology architecture corresponding to FIG. 2 according to one embodiment of the present invention. There are two connection ways between the fPCE and the cPCEs. The first one is indirect connection, in which the fPCE and the cPCEs are placed at some nodes in the network, and they communicates through middle node between them, as shown in FIG. 3 in embodiment 1. The second one is direct connection. The fPCE is isolated from the nodes as an independent device. It connects with each cPCE directly, as shown in FIG. 8. The difference between embodiment 2 and embodiment 1 is the position that the fPCE is placed at. The ways of inter-domain path establishment are the same.

While illustrative embodiments of the invention have been described above, it is, of course, understand that various modifications will be apparent to those of ordinary skill in the art. Such modifications are within the spirit and scope of the invention, which is limited and defined only by the appended claims.

What is claimed is:

1. A method for establishing an inter-domain path that satisfies wavelength continuity constraint, comprising the following steps:
   (1) PCE is designed as two layers, the first layer is Child PCE (cPCE), and the second is Father PCE (fPCE); Each domain has a cPCE, responsible for path processing within its domain; The fPCE is responsible for information communication among cPCEs, and maintains a data base, in which a virtual topology architecture comprised by the border nodes of all domains is stored;
   (2) The source node sends an inter-domain path establishment request containing the source node and the destination node to the cPCE of its domain, the cPCE of the source node domain sends the inter-domain path establishment request to the fPCE;
   After receiving the inter-domain path establishment request, the fPCE will compute one or multiple abstract paths according to the virtual topology architecture stored in its database, and sends it or them to each domain's cPCE; the abstract path only contains border nodes along the way from the source node to the destination node;
   (3) After receiving the abstract path or paths, the cPCE in each domain computes concrete nodes that the abstract path or paths will pass, and obtains one or multiple concrete path segments comprised by the concrete nodes; The cPCE in each domain checks the wavelengths utilization information along the concrete path segment or segments and send the concrete path segment or segments and the available wavelengths in the concrete path segment or segments to the fPCE;
   (4) After receiving the concrete path segment or segments and the information of available wavelengths in the concrete path segment or segments from each cPCE, the fPCE combines all concrete path segments into end-to-end paths, chooses an optimal end-to-end path and an available wavelength on the optimal end-to-end path, and sends the optimal end-to-end path and it's available wavelength to each cPCE;
   (5) After receiving the optimal end-to-end path and the available wavelength on the optimal end-to-end path, each cPCE reserves the available wavelength on the path segment which is the part of the optimal end-to-end path passing its domain: Connecting the designated available wavelength's channel of the fiber signal receiving port with the fiber signal transmitting port in the optical cross-connected device of the node, the fiber signal receiving port and the fiber signal transmitting port are connected with the upstream node and the downstream node respectively; If the wavelength reservation is successful, the cPCE will send the fPCE a message informing successful path segment establishment in its domain; If the wavelength reservation fails, the cPCE will send the fPCE a message informing failed path segment establishment in its domain;
   (6) After the fPCE receiving all successful path segment establishment messages from all cPCEs, it will send a successful end-to-end path establishment message to the cPCE of the domain to which the source node belongs; Then, the cPCE sends the successful path establishment message to the source node, and the source node starts to transmit data using the available wavelength; thus, an inter-domain path that satisfies wavelength continuity constraint is successfully established;
   If receiving a failed path segment establishment message denoting the inter-domain path establishment failed, the fPCE sends the cPCE of the domain to which the source node belongs a failed establishment message, then the cPCE sends it to the source node.

2. A method for establishing an inter-domain path that satisfies wavelength continuity constraint of claim 1, wherein the cPCEs are placed at border nodes of each domain respectively, and the fPCE is placed at node which locates in middle domain or isolated as an independent device.

3. A method for establishing an inter-domain path that satisfies wavelength continuity constraint of claim 1, in the step (5), first, each cPCE sends the path segment belonging to its domain and the available wavelength label to the head node of this path segment, then, the head node in each path segment triggers RSVP-TE protocol, and sends PATH message, the LS object in PAHT message contains the assigned available wavelength label only;
   The PATH message traverses hop-by-hop from head node to tail node along the path segment;
   At each node, it checks whether the assigned available wavelength λ is still available at this moment. If it is occupied by other service, a path-error message is sent back to the head node of the path segment;
   At the head node, an error message is produced and sent to the cPCE and finally sent to the fPCE;
   When the fPCE receives this error message, denoting failed path establishment, it will inform other cPCEs to cancel path segments configuration, i.e. available wavelength reservation, and also inform the source node of the failed establishment;
   If the assigned available wavelength k is still available at this moment, PATH message is passed to next hop to check the status of available wavelength k;
   When the PATH message is passed to the tail node, it denotes that the available wavelength of the path segment is available, and a RESV message is produced at the tail node, which is sent back from the tail node to the head node hop-by-hop;
   At each node, RESV message actually reserve the available wavelength;
   If the available wavelength is successfully reserved, RESV message is passed to the next upstream node, else if the available wavelength is occupied by other service, an error message is produced and sent to the head node;
   When RESV message is passed to the source node, the path segment in this domain is successfully established and a configure ok message denoting successful establishment is produced; The error message or the configure ok message is sent to the fPCE via the cPCE.

* * * * *